US011113302B2

(12) United States Patent
Kelly et al.

(10) Patent No.: US 11,113,302 B2
(45) Date of Patent: Sep. 7, 2021

(54) UPDATING ONE OR MORE DATABASES BASED ON DATAFLOW EVENTS

(71) Applicant: salesforce.com, inc., San Francisco, CA (US)

(72) Inventors: Keith Kelly, San Francisco, CA (US); Ravishankar Arivazhagan, San Francisco, CA (US); Wenwen Liao, San Francisco, CA (US); Zhongtang Cai, San Francisco, CA (US); Ali Sakr, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 189 days.

(21) Appl. No.: 16/392,307

(22) Filed: Apr. 23, 2019

(65) Prior Publication Data

US 2020/0341995 A1 Oct. 29, 2020

(51) Int. Cl.
*G06F 16/25* (2019.01)
*G06F 16/28* (2019.01)
*G06N 5/04* (2006.01)

(52) U.S. Cl.
CPC .......... *G06F 16/254* (2019.01); *G06F 16/284* (2019.01); *G06N 5/04* (2013.01)

(58) Field of Classification Search
CPC ............. G06F 12/0806; G06F 12/0871; G06F 2212/1016; G06F 2212/1041; G06F 2212/601; G06F 2212/6046; G06F 2212/608
USPC ........................................................ 707/602
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |

(Continued)

*Primary Examiner* — Hung T Vy
(74) *Attorney, Agent, or Firm* — Schwabe Williamson & Wyatt

(57) ABSTRACT

Database environments may choose to schedule complex analytics processing to be performed by specialized processing environments by caching source datasets or other data needed for the analytics and then outputting results back to customer datasets. It is complex to schedule user database operations, such as running dataflows, recipes, scripts, rules, or the like that may rely on output from the analytics, if the user database operations are on one schedule, while the analytics is on another schedule. User/source datasets may become out of sync and one or both environments may operate on stale data. One way to resolve this problem is to define triggers that, for example, monitor for changes to datasets (or other items of interest) by analytics or other activity and automatically run dataflows, recipes, or the like that are related to the changed datasets (or other items of interest).

25 Claims, 7 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,324,845 B1 * | 6/2019 | Gottin ............... G06F 12/0875 |
| 10,802,975 B2 * | 10/2020 | Gottin ............... G06F 12/0871 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | | |
|---|---|---|---|
| 2007/0245090 A1* | 10/2007 | King | G06F 12/0897 |
| | | | 711/129 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2019/0243824 A1 | 8/2019 | Gitelman et al. | |
| 2019/0340283 A1 | 11/2019 | Schneider et al. | |

\* cited by examiner

300

| Current PUT request payload | New PUT request payload |
|---|---|
| {<br>"daysOfWeek": [<br>"Tuesday",<br>"Thursday"<br>],<br>"time": {      302<br>"hour": 0,<br>"minute": 0,<br>"timeZone": "America/Los_Angeles"<br>},<br>"frequency": "weekly"<br>} | {<br>"expression": "ALL_SFDC_LOCAL",   308<br>"frequency": "event"<br>}      306<br><br>304 |

| Current PUT request payload | New PUT request payload |
|---|---|
| {<br>"daysOfWeek": [<br>"Tuesday",<br>"Thursday"<br>],<br>"time": {      402<br>"hour": 0,<br>"minute": 0,<br>"timeZone": "America/Los_Angeles"<br>},<br>"frequency": "weekly"<br>} | {<br>"expression": *"[BOOLEAN]"*,<br>"frequency": "event"<br>}     406<br><br>404 |

500 ─ 504
GET /services/data/revision#/ ... / dataflows ← 502

| Current | New |
|---|---|
| { "dataflows": [ {<br>"createdBy": { ... },<br>"createdDate": ...<br>"description": ...<br>"emailNotificationLevel": ...  506<br>"id": "1234567890",<br>"label": ...<br>"lastModifiedBy": {<br>"id": "1234567890",<br>"name": "Admin User",<br>"profilePhotoUrl": ... },<br>"lastModifiedDate":<br>"2019-03-18T23:53:54.000Z",<br>"name": "...  508<br>"nextScheduledDate":<br>"2018-09-19T07:00:00.000Z",<br>"scheduleAttributes": ...<br>"type": "dataflow",<br>"url":<br>"/services/data/v44.0/wave/dataflows/02KRM0000004OCf2AM" } ] } | { "dataflows": [ {<br>"createdBy": { ... },<br>"createdDate": ...<br>"description": ...<br>"emailNotificationLevel": ...  510<br>"id": "1234567890",<br>"label": ...<br>"lastModifiedBy": {<br>"id": "1234567890",<br>"name": "Admin User",<br>"profilePhotoUrl": ... },<br>"lastModifiedDate":<br>"2019-03-18T23:53:54.000Z",<br>"name": "...  512<br>"scheduleAttributes" : "{<br>\\"expression\\": \\"ALL_SFDC_LOCAL\\",<br>\\"frequency\\": \\"event\\"<br>}",<br>"type": "dataflow",<br>"url":<br>"/services/data/v44.0/wave/dataflows/02KRM0000004OCf2AM" } ] } |

| Current | New |
|---|---|
| { "dataflows": [ {<br>"createdBy": { ... },<br>"createdDate": ...<br>"description": ...<br>"emailNotificationLevel": ...<br>"id": "1234567890",<br>"label": ...<br>"lastModifiedBy": {  602<br>"id": "1234567890",<br>"name": "Admin User",<br>"profilePhotoUrl": ... },<br>"lastModifiedDate":<br>"2019-03-18T23:53:54.000Z",<br>"name": "...  604<br>"nextScheduledDate":<br>"2018-09-19T07:00:00.000Z",<br>"scheduleAttributes": ...<br>"type": "dataflow",<br>"url":<br>"/services/data/v44.0/wave/dataflows/02KRM0000004OCf2AM" } ] } | { "dataflows": [ {<br>"createdBy": { ... },<br>"createdDate": ...<br>"description": ...<br>"emailNotificationLevel": ...<br>"id": "1234567890",<br>"label": ...<br>"lastModifiedBy": {  606<br>"id": "1234567890",<br>"name": "Admin User",<br>"profilePhotoUrl": ... },<br>"lastModifiedDate":<br>"2019-03-18T23:53:54.000Z",<br>"name": "...  608<br>"scheduleAttributes" : "{<br>\\"expression\\": \\"*BOOLEAN*\\",<br>\\"frequency\\": \\"event\\"<br>}",<br>"type": "dataflow",<br>"url":<br>"/services/data/v44.0/wave/dataflows/02KRM0000004OCf2AM" } ] } |

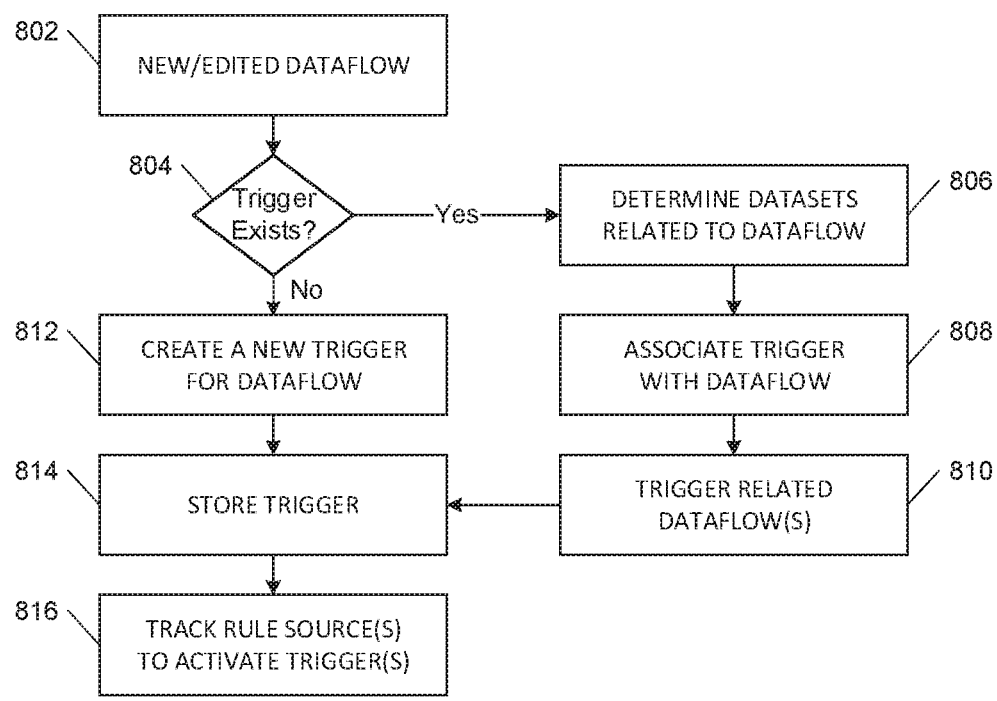
FIG. 8

UPDATING ONE OR MORE DATABASES BASED ON DATAFLOW EVENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to updating databases, and more specifically to automatically updating source databases based at least in part on recognizing that updates performed by a caching database may affect source databases.

BACKGROUND

The material discussed in this background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The advent of powerful servers, large-scale data storage and other information infrastructure has spurred the development of advance data warehousing and data analytics applications. Structured query language (SQL), on-line analytical processing (OLAP) databases, relatively inexpensive data storage costs, increasingly powerful microprocessor environments, and continued progress with Artificial Intelligence to process data, has facilitated capturing and analyzing vast amounts of data. Analyzing data reveals valuable trends and patterns not evident from limited or smaller-scale analysis typically available to a company/user. In the case of transactional data management, the task of inspecting, cleaning, transforming and modeling data with the goal of discovering useful information is particularly challenging due to the complex relationships between different fields of the transaction data, the need for powerful analytics hardware, the benefit that may be achieved with AI-augmented analysis, and the ability to compare one user data sample against a vast collection of other data relating to other users. Consequently, performance of conventional analytical tools with large transaction data sets has been inefficient. That is in part because the time between requesting a particular permutation of data and that permutation's availability for review is directly impacted by the extensive compute resources required to process data structures. This heavy back-end processing is time-consuming and particularly burdensome to the server and network infrastructure. To increase processing efficiency, source database (e.g., customer/user data) processing may be offloaded to caching servers that may cache source database data and perform the analytics with high speed data processing environments.

Unfortunately, scheduling operations that may update a user's source database, such as to create and/or edit data by running dataflows, recipes, scripts, rules, and the like that review, analyze, modify, query, etc. information in the source database data, become difficult to schedule if data from a source database is cached by a caching server. Output from a caching server may be stored in the source database, and used to update the source database, e.g., by running a dataflow using output from the caching server. If a source database runs dataflows on a schedule, and caching servers are caching source database data and analyzing it on a schedule, it is difficult to keep source and caching environments in sync so both environments have current (e.g., not stale) data. Without careful management, a source database might assume a caching server completed a scheduled analysis and perform local reporting or analysis on stale data.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 is an exemplary Application Programming Interface (API) "PUT" command according to one implementation.

FIG. 4 is another exemplary API "PUT" command according to one implementation.

FIG. 5 illustrates a table corresponding to an exemplary API "GET" command according to one implementation.

FIG. 6 illustrates a table corresponding to an exemplary API "GET" command according to one implementation.

FIG. 8 is a flowchart according to one implementation relating to the creation or editing of a dataflow in a user system or database system.

DETAILED DESCRIPTION

Figure 1A:
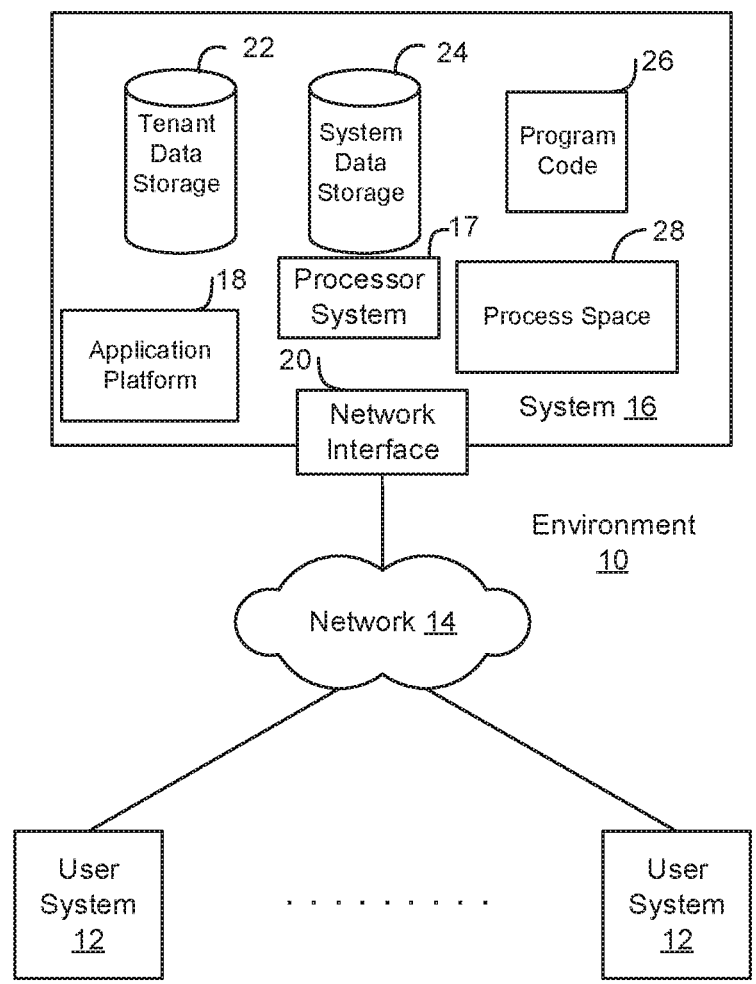
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries. A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases. The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc. The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers (also referred to as users) to describe problems and vocabularies used in articles to describe solutions to those problems.

In some implementations, the users described herein are users (or "members") of an interactive online enterprise network, which may include social features. One example of a company providing online enterprise networking is Salesforce® of San Francisco, Calif. Salesforce is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to specific tools offered by Salesforce, those of ordinary skill in the art should understand disclosed techniques are neither limited to Salesforce tools nor to any other services and systems they provide, and can be implemented in the context of various other database systems such as cloud-based systems that are not part of a multi-tenant database system or which do not provide enterprise networking services.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. It will be appreciated "on demand" may refer to scheduling an action to occur according to a schedule, as well as to schedule an action to occur if "triggered" responsive to recognizing some event or condition of interest, e.g., to activate responsive to changes to specific data or to databases of interest, or if/when another dataflow/event of interest occurs. In the following description, even if not expressly called out, reference to an operation, dataflow, on demand activity, or application execution may be explicitly scheduled or implicitly scheduled, e.g., triggered. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein may be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel® processor or the like and/or multiple CPUs and/or multi-core processors. Similarly, the system 16 (and additional instances of an MTS, where more than one is present) and all of its components can be operator-configurable using application(s) including computer code to run using the processor system 17, which may be implemented to include a CPU, which may include an Intel® processor or the like and/or multiple CPUs and/or multi-core processors.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable or computer-accessible medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
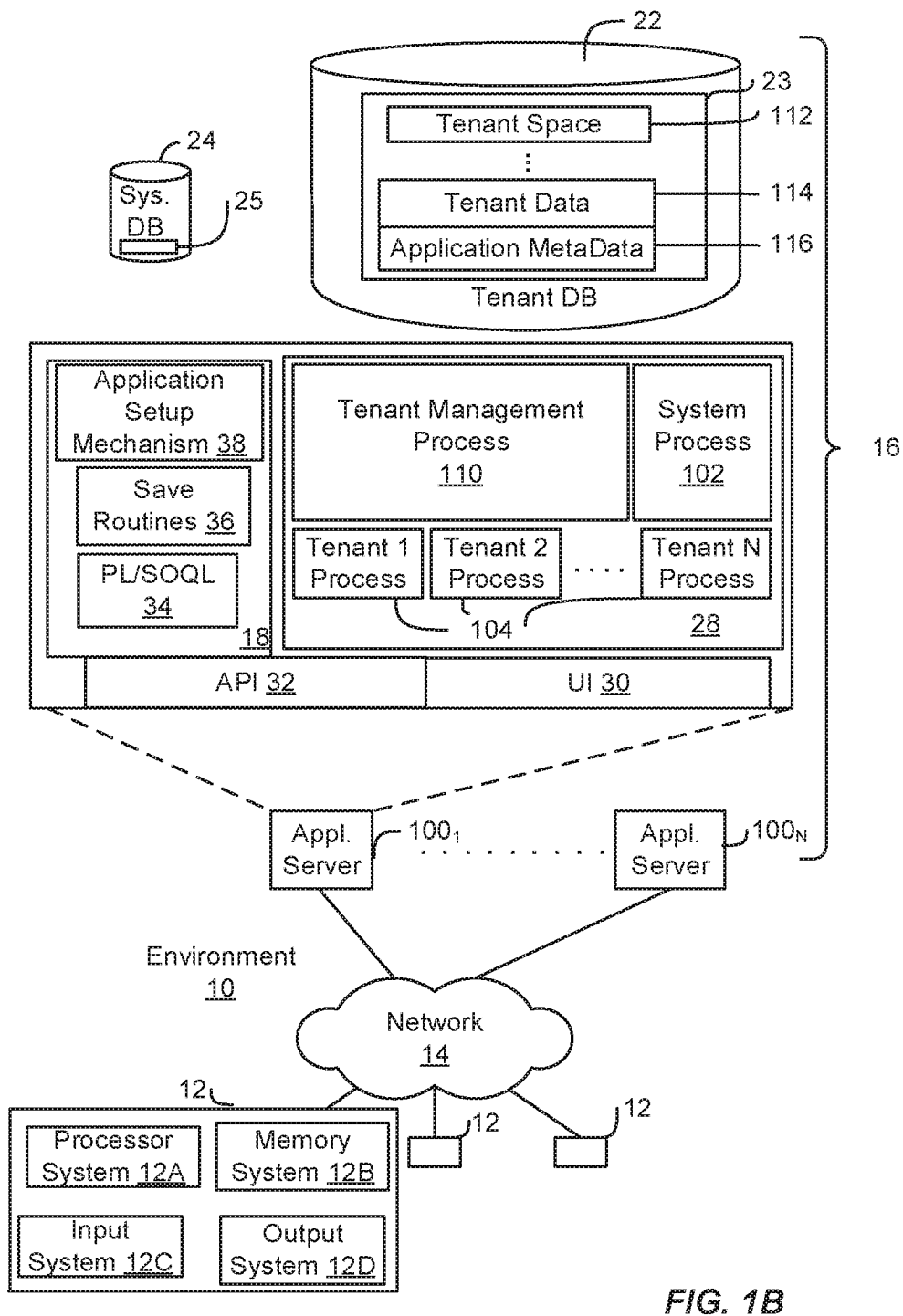
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The processors, while shown disposed within the user system 12, may be a distributed collection of cooperatively executing processors or processing environments (not illustrated). The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine. The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above. In some implementations the API provides scheduling commands to allow setting explicit (time/schedule based) activity, implicit actions that are reactive to other events, such as changed datasets, and "triggers" which are explicit requests (see, e.g., FIGS. 3-6) to watch for and respond to identified actions, events, dataset updates, or the running of dataflows, recipes or the like.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24, and requests may be made in accord with a schedule and/or automatically responsive, triggered in response to changes in datasets or monitored portions of databases that are of interest. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table." Changes made to a table or dataset may trigger one or more follow-on request to update other related data/objects/derived dataset/etc.

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
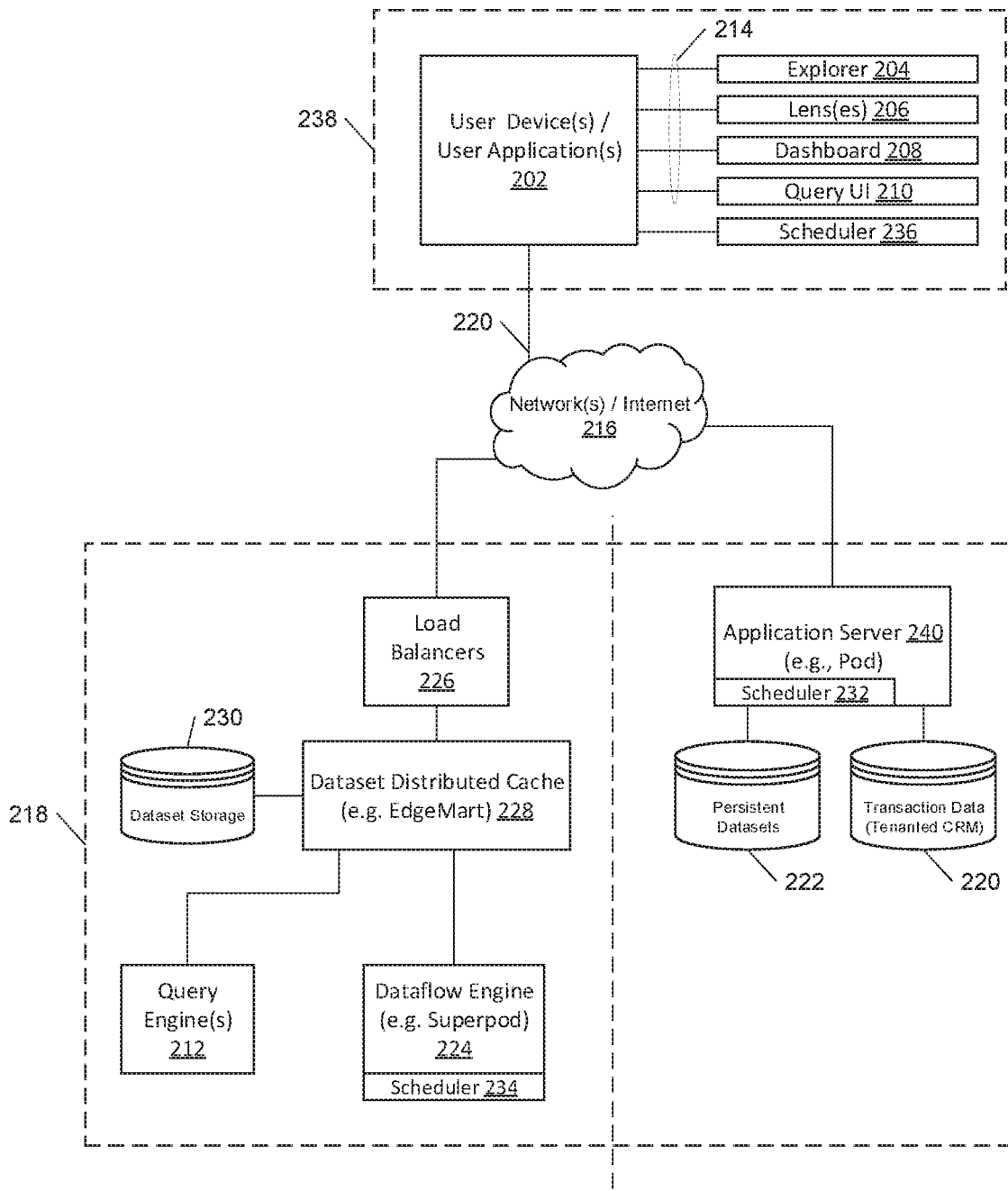
FIG. 2 illustrates, according to one implementation, a high-level system diagram of a database environment in which various aspects of the disclosed technology may be used.

FIG. 2 illustrates, according to one implementation, a high-level system diagram of a database environment 200 in which various aspects of the disclosed technology may be used. One or more user device(s) or user application(s) 202

(hereafter simply user device) may be hardware and/or software to allow manipulating and interacting with data, datasets, dataflows and recipes. Some of the basic interactions was discussed above with respect to FIG. 1. A user device may have access to a user interface to access various tools with which to interact and manipulate user (tenant) data.

For example, an Explorer 204 too may be used to enter and/or run queries against database data, a Lens 206 tool used to inspect and visualize results. There may be a Dashboard 208 tool to dynamically manage multiple lenses and tools. A query UI 210 may provide an interface to work with data structures and algorithms to operate on one or database, and use a Query Engine 212 discussed below. In one implementation, a real-time query language describing data flow may be used to analyze "EdgeMart" data, essentially a structured data format that may be efficiently analyzed, as well as support scripts (a list of actions/instructions) to describe desired query results. In one implementation, data may be acquired, extracted and/or synthesized from other sources for analytics, and may be augmented, transformed, flattened, etc. before being provided as customer-visible data. It will be appreciated various modules may separately or cooperatively operate to provide an interface for users to choose filtering, grouping, and visual organization options, as well as to display query results that may have been provided, for example, by way of the user device 202.

It will be appreciated the Explorer 204, Lens 206, Dashboard 208, Query UI 210 may be implemented as any combination of hardware, software and/or firmware and may be implemented in any type of computing device or cooperatively executing computing system. It will be appreciated there may be an Application Programming Interface (API) (e.g., FIGS. 3-6) used by the tools 204-210. Although as illustrated the tools 204-210 appear directly coupled with the user device 202, the links 214 represent connections over any data path including direct and indirect links, including local and/or private networks and/or a public network 216 such as the Internet. It will be appreciated user device 202 may be implemented as any combination of individual or cooperative operating hardware, software and/or firmware/ etc. Devices and applications associated with a user device 202 may take one of a number of forms as discussed above with respect to FIG. 1, including wearable or virtual reality (VR). The tools 204-210 may communicate with other illustrated items 218 by one or more data path 220. It will be appreciated the other illustrated items 218, while shown with various interconnections, may all be interconnected by way of one or more network/Internet 216.

In some implementations, a database 220 may store transaction data, e.g., Tenant data such as Customer Relationship Management data (CRM) as discussed above with respect to FIG. 1, which may be structured, semi-structured, or unstructured information from one or more tenants. User device 202 may communicate with various items in environment 200 using various wire and/or application level protocols. For example, using HTTP, a user device may use a web browser to send and receive HTTP messages with an Application Server 240. It will be appreciated the Application Server may operate as discussed above with respect to FIG. 1 Application Server(s) 100*i*. In one implementation, the Application Server 240 is a FIG. 1 Application Server 100*i*. In one implementation the Application Server may be a Salesforce Pod. In one implementation the Application Server may have associated Persistent Datasets 222 which may include data, such as Tenant datasets, that may be cached by another server or device, such by as a Dataflow Engine 224, for processing of the cached datasets. In one implementation, the interface between Application Server 240 and the Dataflow Engine 224 includes load balancing functionality 226, such as discussed with respect to FIG. 1 network interface 20. Load balancing allows multiple Persistent Dataset 222 caching operations to be handled by a Dataset Distributed Cache 228, which may store datasets in a database 230 for analytics processing by the Dataflow Engine.

In one implementation the analytics processing includes the Dataflow Engine 224 supporting Einstein Analytics by Salesforce. Einstein Analytics, as well as other analysis platforms, programs, or the like, may be accessed by way of a user interface (UI) available to the user device 202, which may include using tools 204-210. The Application Server 240 may be configured to implement and execute analytical software applications as well as provide related data, code, forms, web pages and other information to and from a user device and to store to, and retrieve from, a transaction related data, objects and web page content. It will be appreciated the environment may have applications other than or in addition to analytical software and transactional database management systems.

In one implementation, various items in the environment 200 may include a scheduler, such as an Application Server scheduler 232, a Dataflow Engine scheduler 234, or perhaps even a Scheduler 236 available to the user device which may operate independent of and/or in conjunction with other schedulers, e.g., items 232, 234. A scheduler, in one embodiment, addresses data synchronization issues that may arise when the Dataflow Engine 224 operates on datasets cached, for example, from the database 222 storing, for example, Persistent Datasets. A scheduler 232-234 may initiate transactions based on a variety of conditions, including a set schedule start time, as well as based on dependencies, such as watching for changes to flagged datasets or other data of interest in a database, change in status of a user device 202, or based on Boolean logic statements that relate to changes to datasets or the execution of a transaction, which is evaluated as true, then indicates some action is to be taken. The action may of course be to update a dataset, run one or more dataflow, recipe, or the like, or take other action. As will be discussed further below, various on-demand, scheduled, implied and triggered data management may be integrated into analytic processing, such as Einstein Analytics or other dataflow processing, to ensure results from data analytics or other processes are properly propagated to other dataflows, recipes, processes, applications, etc. that may relate to or otherwise rely on analytics results.

In one implementation, datasets associated with a transaction may be cached by the Dataset Distributed Cache 228 for processing by the Dataflow Engine 224. It will be appreciated caching data allows users (Tenants) to maintain server-independent dataset availability and local processing, e.g., not by the Dataflow Engine, and thus provide a larger window of operation to a user and can reduce costs by offloading operations from a high-performance (and therefore likely more expensive) servers. In one implementation, Salseforce® analytics tools may create and manage data in the database 230 which may store datasets. In one implementation, the Dataset Distributed Cache 228 includes or is one or more Salesforce EdgeMart(s) 214. In one implementation, a user device 202 may use a user-interface (UI) tool, such as, the Query UI 210 tool to create or modify a workflow or dataflow on an Application Server 240. As discussed above, a workflow, dataflow, recipe, or the like may be set to operate on a schedule, or be triggered based on other considerations such as if other data or a database is modified. In one implementation, when a dataflow starts, it may utilize an API to access an Application Server 240 to retrieve relevant data and/or metadata, convert data into a set of raw data that may be transformed to produce final customer visible data in the Dataset Storage 230.

FIG. 3 is an exemplary Application Programming Interface (API) "PUT" command according to one implementation. One skilled in the art will appreciate various APIs (e.g., a REST API providing web services) may be used to assist with accessing and interacting with various user system, e.g., FIG. 2 items 238 and database system, FIG. 2 items 218. Generally speaking, an API may be used to access data, and it will be appreciated the API may abstract out data, databases, database elements (e.g., records, tables, rows, cells, etc.), queries, results, and the like. In some implementations, API calls may be a form of a call to a referred to as a Uniform Resource Identifier (URI), also referred to as a Uniform Resource Locator (URL), that may be accessed to set, get, delete, or perform any desired operation on data stored in a local and/or remote data storage, e.g., to access and/or modify data, databases, interfaces, rules, recipes, etc. associated with user systems and/or database systems as discussed above.

It is assumed the reader is familiar with the Salesforce database and analytics environments. In this implementation, customer data, such as may be associated with FIG. 1 User System 12 or FIG. 2 user device 202, may be cached or replicated in another system, such as the FIG. 1 database System 16 or more particularly for use by FIG. 2 Dataflow Engine 224. In the following description, the phrase "database system" will include the systems/environments that may be caching and/or processing user data such as by FIG. 1 database System 16 or FIG. 2 Dataflow Engine, and the phrase "user system" will include user-related systems or environments that may be the source of or otherwise generating, providing and/or sharing data with the database system.

In one implementation, a dataflow or recipe, may be generally thought of as script or series of operations that extract data from a data source (e.g. some sort of storage/state preserving medium storing user data), modify it in some way, and then save it in a format that may be further queried, manipulated, etc. A recipe, as discussed above with respect to FIG. 1, may manipulate data in multiple datasets or connected objects, apply transformations, and output results to a new dataset. The dataflow and recipes may be manually run or scheduled to run. As discussed for FIG. 2 schedulers 232-236, scheduling may be explicitly scheduled for a specific time. However, one skilled in the art will appreciate that cached data, such as operated on by a Dataflow Engine 224, decouples updating user data, making explicit scheduling difficult. In the illustrated implementation, a schedule may be set to occur on satisfaction of a variety of conditions, including assigning a scheduled start time (e.g., selected times on selected days each week), as well as based on dependencies, such as watching for changes to data in a database, or based on Boolean logic statements associated with data located elsewhere (e.g., in another dataset, other database, etc.) or associated with execution of other events or transaction. The action may of course be to update data, run one or more dataflow, recipe, workflow or the like, or take some other action. Note although the illustrated implementation is presented as relating to scheduling a dataflow, one skilled in the art will appreciate the disclosure applies to scheduling scripts, recipes, transaction sequences, replay transactions, or any other data manipulation or series of manipulation. It will be appreciated dataflows, recipes, and other data analysis, manipulation and/or transformation operations may output data for use, for example, by FIG. 2 Lens(es) 206, Dashboard 208, or other tool, data analyzer, or user interface.

When analytics tools, such as Einstein Analytics are used by a database system to analyze user data, user data (typically large amounts of data) may be cached by the database system to facilitate more efficient extraction of data into the analysis engine. However, as discussed above, use of analytics with cached data risks the analysis may be out of sync with the source data. This is particularly likely when both the database system and user system both have dataflows, recipes, etc. operating on their respective copies of user data. In one implementation, this problem is addressed by employing a process to enable correlating dataflows, recipes and other transformative and/or analysis processes with completion of analysis that may be performed by the database system.

In a typical database system, dataflows are run on a schedule. In the illustrated implementation, the table 300 illustrates a typical 302 and new 304 PUT request. The PUT request is an exemplary request according to one implementation to establish a schedule for running a dataflow. In the left column 302, one can see a dataflow is requested to be run on a specific schedule, e.g., on Tuesday/Thursday at a specific time, and the frequency is weekly. As noted, however, if user data originating from FIG. 2 Persistent Datasets 222 is cached by, for example, a FIG. 2 Dataflow Engine 224, so that the Dataflow Engine may perform analytics on user data, then as discussed above if specific schedules are used as in left column 302 then data may become out of sync. For example, a Dataflow Engine may be used when it is not practical or possible for a user device/user application 202 to perform the analysis, such as when the data involved is large and therefore impractical or too slow to analyze locally, or when the analysis may require application of one or more tools that are not available or too costly for a user but that may be provided by a database system for processing the data, or when analysis is with respect to other data the user cannot access.

Since the user system may be operating on data that has been cached for use by the Dataflow Engine 224, if both the user system and database system are using schedule based dataflows (or recipes or the like), it will be appreciated the schedules should be arranged so that dependencies are resolved. For example, the database system should complete analysis, e.g., Einstein Analytics is performed with datasets cached for use by a Dataflow Engine, and update the user system with results, before the user system performs operations such as generating performance statistics relying on the database system results. Since it is difficult to estimate and coordinate user system dataflows with database system dataflows, something other than a set schedule should be used to manage the dataflows, recipes, and the like.

The right column 304 of table 300 illustrates, according to one implementation, a different way to coordinate multiple systems attempting to access and perhaps update data. As illustrated, an API is provided for creating and manipulating, among other things, dataflows, and rather than state a specific schedule as in item 302, instead the dataflow is requested to be created with an "event" based frequency 306. In this implementation, instead of having to wait for a scheduled time to run, an "expression" is evaluated to determine if and when the dataflow should run (e.g., when the dataflow is triggered) based at least in part on analyzing a dataflow and identifying changes to its data sources. Assuming a database system such as one provided by Salesforce, the expression may be to watch for updates to "ALL_SFDC_LOCAL" 308, which in this environment represents looking for any changes to "ALL" Salesforce sources, e.g., leads, opportunities, etc. relating to the dataflow. In one implementation the "LOCAL" part of the event requirement refers to changes to data that is local to a particular Application Server 100*i*, e.g., to a Salesforce Pod to which the dataflow may relate. However, one skilled in the art will appreciate the trigger mechanism is applicable to any database system that may at least temporarily cache and process user data, and that the dataflow or similar process may relate to data stored in multiple Pods or other data storage. Thus, when something of interest (the event 306) occurs, such as the all leads or other data of interest has been touched or modified, the dataflow associated with the trigger 308 knows it needs to run now rather than waiting for a scheduled time as in the left side 302 of the table. This allows running or perhaps rerunning a dataflow, such as after a Dataflow Engine 224 generates output, to ensure the dataflow is operating on the most recent data.

FIG. 4 is an exemplary variation on the FIG. 3 API "PUT" command according to one implementation. In this implementation, the left side 402 of the table 400 corresponds to the left side 302 of table 300, e.g., as discussed above with respect to FIG. 3 a PUT request has a payload including defining running a dataflow or similar command at a scheduled periodicity. In this implementation, on the right side 404 of the table, instead of arranging to trigger a dataflow based on an update to ALL_SFDC_LOCAL 308, instead a Boolean 406 expression may be used to define the trigger for running the dataflow. It is assumed Boolean expressions are understood, e.g., it is an expression that corresponds to a system of algebraic type notation that may be used to represent logical propositions or relationships that can generally be evaluated to get a result, typically a true/false result based on the evaluation and interpretation of the propositions. It will be appreciated Boolean is used here for exemplary purposes and any notation scheme may be used to explicitly and/or implicitly reference conditions that would trigger operation of a particular dataflow.

In the illustrated implementation, the text "[BOOLEAN]" 406 is used to represent what might be present in the PUT request payload, and is not intended to actually be a Boolean statement. The FIG. 1 and FIG. 2 discussions included use of various User Interface (UI) and techniques for interacting with user system and database system databases. A UI may be used to construct dataflows of interest, and in particular result in creation of the new PUT request payload. The user system and/or database system are capable of identifying sources of data associated with a dataflow as well as detect dependencies between various data sources and dataflows, recipes, and the like. While the FIG. 1 and FIG. 2 discussion may assume use of a UI to create dataflows and will internally create the API calls such as depicted in FIGS. 3-6, it will be appreciated these structures may be created manually if desired.

The FIG. 3 discussion focused on recognizing changes to the ALL_SFDC_LOCAL data, which relates only to data associated with the database system. In the FIG. 4 implementation, the Boolean expression may refer to both user system as well as database system associated data, resources, dataflows, recipes, etc. The expression 406 may be used to select an arbitrary set of data sources that when changed trigger re-running a dataflow. The expression may also refer to other dataflows or any other object, table, variable, state, status, or any other detectable status that can be observed to change so as to trigger running the dataflow associated with the expression. In one implementation, data sources may be Salesforce-local or externally provided, e.g. by way of connectors, or registered datasets.

It will be appreciated an expression may incorporate dataflow status, such as creation, starting, stopping, completion, error, elapsed time between running the associated dataflow or other dataflow, or any other detectable condition. Thus, the Boolean expression may be an arbitrarily complex statement testing the state or status of a variety of user system and database system (for example, Salesforce-local) data, dataflow execution status, etc. In operation, for example, user data from the user system may be cached by the database system in which a FIG. 2 Dataflow Engine 224 may cache and process user data. The user system and/or database system may have triggers associated with dataflows that watch for changes made by the Superpod which then causes these related dataflows to run. In such fashion, user system tools, for example, may automatically run and re-run to update user-local data after results have been received from the Salesforce environment or other database system.

FIG. 5 illustrates a table 500 corresponding to an exemplary API "GET" command according to one implementation. It will be appreciated processing any of the illustrated API calls may be handled by one or more servers or other computing devices that may individually and/or cooperatively operate to process API queries and interact with various computing device and/or engines and/or lenses 204-210, 222-226 such as those discussed above with respect to FIG. 2 or in accord with FIG. 1.

Table 500 shows an exemplary API GET command 502. The GET command may have a format like an URI/URL (hereafter simply URI) as discussed above, and may be implemented as an actual URL/URI to be processed within a web browser or other hardware or software environment compatible with processing URIs. The URI may contain components, e.g., versioning values 504 that assist the receiving environment, such as the database system, to better process the request. And it will be appreciated that the database system may support a variety of communication formats as needed, e.g., JSON, XML, etc., and it may utilize smart URIs such as "Friendly URLs" that enable packing multiple requests into a single URI based on the construction of the URI. This also applies to the other illustrated API implementations.

In the illustrated implementation, the left side 506 of table 500 shows exemplary data that may be received back from processing a GET request 502. The responsive data corresponds to one dataflow such as one that might have been defined in association with the PUT request shown in the left side 302 of FIG. 3 table 300. It will be appreciated an actual response to the GET request may include more information than illustrated. The left side of the table shows a typical result, e.g., information concerning the dataflow and scheduling information 508 that shows, for example, a next scheduled specific runtime. However as discussed above, a drawback to setting a specific schedule for the dataflow is that it may be out of sync with other operations that may also be changing data associated with the dataflow.

To address this, as discussed above with respect to FIGS. 3-4, the right side 510 of the table 500, shows results according to one implementation for using triggers/a triggering event instead of a set schedule. When the FIG. 3 trigger expression 308 is used in the PUT API call, when a corresponding GET request 502 is made, instead of a set schedule 508, instead the result may include an expression "ALL_SFDC_LOCAL" 512 that corresponds to FIG. 3. and indicates the dataflow, recipe or the like associated with the illustrated GET request result is to run when all Salesforce local variables for that dataflow have been updated. Although this illustrated implementation corresponds to monitoring for data local to the database system, e.g., the Salesforce environment, it will be appreciated different data, variables or the like could be monitored with a corresponding adjustment to the FIG. 3 PUT discussion.

FIG. 6 illustrates a table 600 corresponding to an exemplary API "GET" command according to one implementation. As shown, there is a left side 602 of the table that is the same as the left side 506 of the FIG. 5 table 500, where the result of the FIG. 5 GET command 502, returns details of an associated dataflow that has a set schedule 604. The right side 606 of the table, however, shows results corresponding to using an expression 608 to trigger when a dataflow, recipe or the like is to execute. As discussed above with respect to FIG. 4, the expression may be a Boolean statement that may refer to both user system as well as database system associated data, resources, dataflows, recipes, etc. Note that as with FIG. 4, use of a "Boolean" statement is for exemplary purposes and that any notation scheme may be used to explicitly and/or implicitly reference conditions that would trigger operation of a particular dataflow. The expression 608 may represent the intent that any changes to an arbitrary set of data sources or other identifiable information may trigger running or re-running a dataflow.

It is expected the expression 608 may refer to other dataflows, recipes, or any other object, table, variable, state, status, or other detectable state or status that may be observed to change so as to trigger an action, such as running a dataflow associated with the expression. In one implementation, data sources may be Salesforce-local or externally provided, e.g. by way of connectors, or registered datasets. An expression may incorporate and/or reference dataflow status, such as creation, starting, stopping, completion, error, elapsed time between running the associated dataflow or other dataflow, or any other detectable condition.

Thus, the Boolean or other expression format, if used, may be an arbitrarily complex statement testing the state or status of a variety of user system and database system data, dataflow execution status, etc. Thus, in operation, user system and database system dataflows may operate independently, where each may recognize data sources used by the other and when either of them changes data of interest, it may be assured that the related operations are run to ensure data is in sync. It will be appreciated the expression may include dependencies such as only run after completion of a different dataflow. This allows, for example, user data to be cached from a FIG. 2 Persistent Dataset 222 into a Dataset Storage 230 for use by a Dataflow Engine 224, where a user device related dataflow may update performance statistics that relies on the output of the Dataflow Engine processing by having an expression that indicates it should run after changes made by the Dataflow Engine.

The expression 608 may accommodate arbitrarily complex statements. For example, if a dataflow, recipe or the like relates to data objects A, B and C, instead of stating as in the fixed schedule 604 that each of A, B and C should be updated, instead the expression could be constructed so as to say if A is updated then rerun the dataflow each time A changes, however if B is updated then recognize this but only rerun the dataflow weekly, and C can be flagged as "don't care", rerun the dataflow opportunistically based on other considerations such as the A or B getting updated, or because the dataflow is itself related to another dataflow or operation that might trigger it, etc. This allows for complex rules controlling if and when a dataflow is run or rerun, as well as to control with specificity which objects, tables, entries, etc. are updated. And as noted above, calling the expression "Boolean" is for expository convenience. The expression may be of any form/format allowing for arbitrarily complex logical statements and/or tests that may evaluate to "True" and trigger an event. Simplistically the event is running a dataflow, but it may be in fact related to performing arbitrary operations, computations, data movement and whatever else is needed to satisfy an expression.

In one implementation, the expression 608 may cross-reference dataflows explicitly or implicitly to ensure, for example if a Dataflow Engine 224 runs a dataflow, it causes related database system dataflows or user system dataflows to run or re-run. It will be appreciated there may be a cascade of triggers. For example, running a first dataflow may change a dataset that causes a second dataflow to run, which in turn changes a dataset related to the first dataflow. This could cause the first dataflow to run again leading to a loop that is discussed below. It will be appreciated interdependency of operations may relate to operations performed by any device, software, server, etc. that may be associated with either the database system or the user system.

As noted, interdependent dataflows, recipes, or the like may, for this and the FIGS. 3-5 implementations, result in loops. There are a variety of techniques and/or graph theory analysis that may be applied to analyze the trigger conditions for a dataflow, recipe or the like to detect and correct loops. One option is to trace out potential dataflow execution sequences and reorder some or all of a dataflow operations to eliminate a loop or minimize risk of a loop. As noted above not all expressions require immediate reevaluation even when related items (e.g., data) of interest have been changed. An example is the weekly updates to the "B" group, where even if it's associated data changed, it won't result in rerunning the dataflow related to that data for a week. In this type of situation it may be possible to rearrange the order of cascading triggers such that the series of triggers ends with the optional update not running. Alternatively one may be presented with (or elect) options such as to restrict the number of cycles to a predetermined number, to stop after a designated "important" or "most important" dataflow is run, to allow a certain overall runtime duration, or apply other constraints to decide when to end a loop.

In one implementation, a schema (e.g., a hierarchical arrangement of data types and values that may be implemented through cross-referenced tables, linked lists, etc.) may be used to define and track triggers. Triggers may be assigned an ID, a Target that identifies associated dataflows, recipes, or other events that may be triggered, a LastTriggerDate to indicate when the trigger was last run (and which may be used to prune infrequently used triggers or to identify triggers that never execute and that hence represent an issue needing attention), and an expression that corresponds, for example, to the FIG. 3 expression 308 or FIG. 4 expression 406. As discussed above, there may be multiple dependencies A, B, C for a dataflow, the last trigger date information allows determining when the trigger was last triggered, and thus ensure the trigger is timely. For example, if a trigger is to run after A and B are updated, when A updates but not B, when A updates the trigger schema may be inspected and determine that the trigger was called due to changes in A, but we need to wait for B to be updated; when B is updated it can be determined both A and B updated after the last trigger date and therefore the trigger should be triggered and all related dataflows or other operations as defined in the trigger should be performed.

Figure 7:
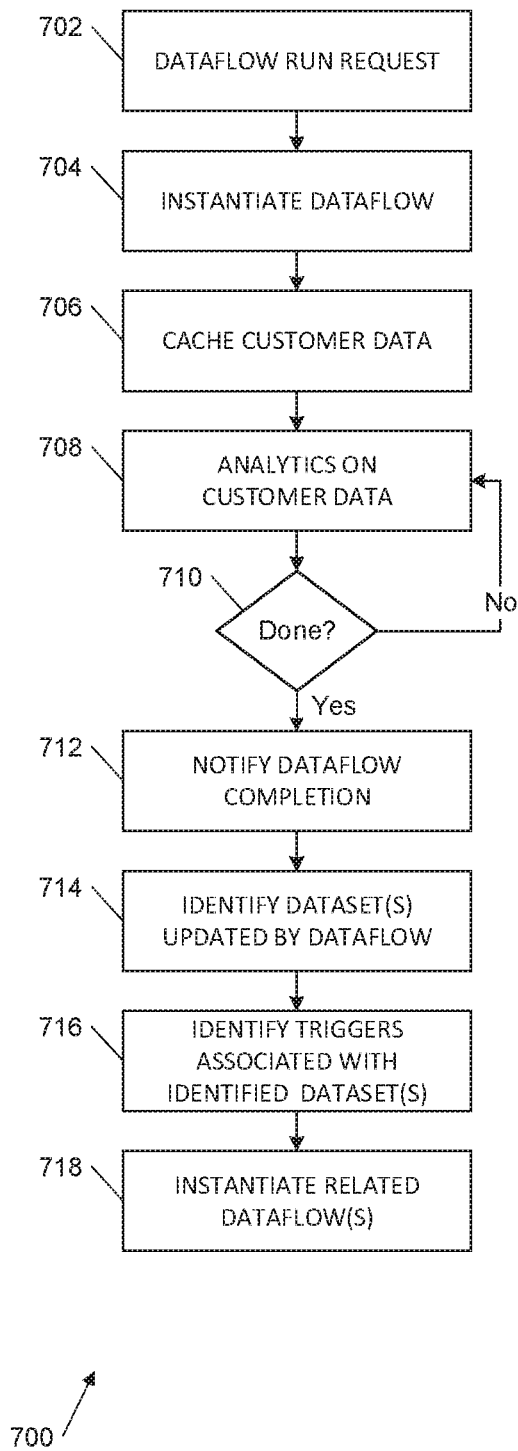
FIG. 7 illustrates a flowchart according to one implementation.

FIG. 7 illustrates a flowchart 700 according to one implementation. A dataflow run request 702 may be received, either explicitly such as through a user interface as discussed with respect to FIG. 1 interaction with a database system, or implicitly such as through being triggered by another dataflow, data being updated, etc. that now requires running the dataflow. In one implementation, the dataflow runs on a FIG. 2 Application Server 100*i*. After receiving the request, and assuming permission to run the dataflow (security checking may used but it is not illustrated), the dataflow may be instantiated 704.

Let's assume the dataflow needs to be performed, at least in part, on a FIG. 2 Dataflow Engine 224, such as may be required when the data is too large to be processed by a user system, requires access to tools only available to the database system providing the Dataflow Engine, requires access to proprietary data, etc. It will be appreciated there may be many reasons to shift processing to a Dataflow Engine but a typical reason is the complexity of the processing requires a high performing environment such as one provided by a Dataflow Engine to make more practical performing the requested dataflow 702. For example, Salesforce provides an Artificial Intelligence (AI) based Einstein Analytics that derives business intelligence and data results, but it requires a powerful environment and proprietary tools in order to perform its analytics. To facilitate Dataflow Engine processing, customer data is cached 706 by the database system, e.g., user system data stored on storage associated with an Application Server (e.g., FIG. 2 Transaction Data 220 or Persistent Datasets 222) is cached on storage (e.g., FIG. 2 database 230) associated with the Dataflow Engine. Movement of data for caching may occur as discussed above in response to operations or transactions discussed above with respect to FIG. 1 and FIG. 2.

Once cached, analytics may be performed 708 on the customer data. A test may be performed to determine if 710 the analytics processing is completed. If not then processing may loop back to performing 708 the analytics. Note that the various user system and database system processes are often occurring asynchronously to each other, hence the illustrated looping back includes sending a heartbeat (not illustrated) to the originator of the dataflow run request 702. This allows the request originator to know processing has not stalled or otherwise failed. When the test if 710 the analytics has completed succeeds, then in one implementation, the Application Server 100*i* (e.g., a Salesforce Pod) from which the data was cached is notified 712 of completion of the analytics.

As discussed above, after completing analytics, all datasets and/or any other items of interest that are associated with triggers are identified 714 to determine if there is a dataflow, recipe, or the like that has conditions that have been satisfied after performing the analytics. As discussed above, if schemas or other data structures are used to track triggers, after identifying 714 modified dataset(s) the associated triggers may then be identified 716 according to the schema. For example, if the analytics updated all of the Salesforce local variables as discussed above with respect to FIGS. 3 and 5, then the dataflow(s) triggered by changes to "ALL_SFDC_LOCAL" may then be instantiated. Similarly, if the Boolean expression in FIGS. 4 and 6 is satisfied then the dataflow(s) relating to satisfaction of the Boolean expression may then be instantiated 718.

FIG. 8 is a flowchart 800 according to one implementation relating to the creation or editing of a dataflow in a user system or database system. A dataflow may contain user data, and in a MTS the tenants may use database system dataflows as well as create customized dataflows (which may be variations of standard dataflows or new dataflows). A database may include dataflows, and may interact with and transfer data with a dataflow. Triggers may trigger dataflows, recipes and the like, which themselves may create and/or update a dataflow or other database component.

A user interface (GUI) available to each user system 12 or user device/user application 202 may be used to create and/or edit 802 dataflows. After creating or editing, a test may be performed to determine if 804 a trigger (e.g., created as discussed for FIGS. 3-6) already exists that relates to the dataflow. In an implementation where triggers may be associated with data sources as well as dataflows, there may be one trigger associated with multiple dataflows based on an overlap in data sources common to multiple dataflows. It will be appreciated editing a dataflow might make a previously unrelated dataflow now relevant to a trigger based on a change in the data sources associated with a dataflow.

If 804 a trigger already exists that is monitoring one or more components, e.g., data source, dataset, or other item of interest to a trigger, of the new/edited dataflow, then in one implementation where triggers may monitor source datasets for multiple dataflows, then datasets for the new/edited dataflow are identified 806 and the existing trigger updated 808 be associated with the new/edited dataflow. It will be appreciated while we may assume triggers are monitoring for changes to data sources associated with a dataflow the trigger is monitoring, a trigger may monitor for any arbitrary data, status or other detectable change as a reason for running or rerunning a dataflow. In another implementation, where dataflows each may have their own trigger, a new trigger may be created (not illustrated) and associated with the new/edited dataflow to monitor its dataset (or other) dependencies. If the new/edited dataflow is run, all triggers affected by the new/edited dataflow may be triggered 810. Recall triggers may have complex expressions and while a dataset may have changed it may not be a change requiring the running of a dataflow, recipes, or the like that may be associated with a trigger. Updating may also include updating last run times for any dataflows associated with the trigger.

If 804 a trigger did not exist, then a new trigger may be created 812 to monitor for changes to datasets (or other detectable changes of interest for the trigger) associated with the new/edited dataflow. To create a trigger, a user may interact with a GUI (or other interface) to describe the dataflow to be created or edited, cross-reference with data or datasets to associate with the dataflow, identify related dataflows, recipes, other objects, etc. A trigger may also be created by dataflows or recipes that may work with datasets, Salesforce objects, etc. And a trigger may be automatically generated along with dataflow creation.

After triggering 810 related dataflows, or after creating 812 a new trigger, the trigger may be stored 814. It will be appreciated the trigger may be defined according to a schema as discussed above, so that trigger definitions may be stored, accessed and edited in a defined way to facilitate tracking and cross-referencing triggers to each other and to dataflows, datasets, objects, etc. to ensure the triggers track data changes, events, etc. that should activate the trigger. Then, along with other activity in the user system and database system, changes to items of interest, e.g., updates to datasets (or other changes of interest associated with a trigger), may be tracked and result in activating 816 related triggers as needed.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/ program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program for a database for managing customer data, the customer data having external data and internal data based at least in part on the external data, and the database having a scheduler to manage running a first dataflow, the computer program comprising a set of instructions operable to:
    periodically retrieve a portion of the customer data in a first format;
    cache the portion of the customer data in a second format;
    perform a first dataflow on the cached customer data;
    determine one or more dataset modified by the first dataflow;
    identify a trigger having associated therewith a criteria for changes to the one or more dataset, the trigger to specify a second dataflow different from the first dataflow; and
    automatically perform the second dataflow responsive to the criteria being satisfied.

2. The computer program of claim 1, wherein the instructions for the first dataflow further comprising instructions to apply artificial-intelligence based analytics to the customer data.

3. The computer program of claim 1, the instructions including further instructions operable to:
    identify a second trigger related to performing the first or the second dataflow; and
    instantiate a third dataflow different from the second dataflow associated with the second trigger.

4. The computer program of claim 1, wherein the instructions for the scheduler further comprising instructions operable to perform the determining one or more dataset modified by the first dataflow.

5. The computer program of claim 1, wherein the instructions for the trigger further comprising instructions to require every dataset associated with the first dataflow to be updated before executing the second dataflow.

6. The computer program of claim 5, wherein the instructions comprise further instructions for each dataset associated with the first dataflow to correspond to internal data.

7. The program of claim 1, in which the instructions further include instructions for the criteria to identify a relationship between one or more dataset modified by the first dataflow, and to perform determine if the perform the first dataflow satisfies the criteria, then the automatically perform the second dataflow.

8. The program of claim 7, wherein the instructions for the relationship further include instructions to provide a Boolean-type statement identifying events associated with the instructions to perform the first dataflow that satisfies a condition.

9. A database implemented method for managing customer data, the customer data having external data and internal data based at least in part on the external data, and the database having a scheduler to manage running a first dataflow, the method comprising:
    periodically retrieve a portion of the customer data in a first format;
    caching the portion of the customer data in a second format;
    performing a first dataflow on the cached customer data;
    determining one or more dataset modified by the first dataflow;
    identifying a trigger having associated therewith a criteria for changes to the one or more dataset, the trigger specifying a second dataflow different from the first dataflow; and
    automatically performing the second dataflow responsive to the criteria being satisfied.

10. The method of claim 9, the first dataflow including applying artificial-intelligence based analytics to the customer data.

11. The method of claim 9, further comprising:
    identifying a second trigger related to performing the first or the second dataflow; and
    instantiating a third dataflow different from the second dataflow associated with the second trigger.

12. The method of claim 9 wherein the scheduler performs the determining one or more dataset modified by the first dataflow.

13. The method of claim 9, further comprising the trigger configured to require every dataset associated with the first dataflow to be updated before executing the second dataflow.

14. The method of claim 13, wherein elements of each dataset associated with the first dataflow correspond to internal data.

15. The method of claim 9, in which the criteria identifies a relationship between one or more dataset modified by the first dataflow, and wherein if the performing the first dataflow satisfies the criteria, then the automatically performing the second dataflow.

16. The method of claim 15, wherein the relationship includes a Boolean-type statement identifying events associated with performing the first dataflow that satisfies a condition.

17. A database system for managing customer data, the customer data having external data and internal data based at least in part on the external data, and the database having a scheduler to manage running a first dataflow, the system comprising:
- a first database component to periodically retrieve a portion of the customer data in a first format;
- a cache to cache the portion of the customer data in a second format;
- a first server to perform a first dataflow on the cached customer data;
- a second database component to determine one or more dataset modified by the first dataflow;
- a trigger manager to identify a trigger having associated therewith a criteria for changes to the one or more dataset, the trigger to specify a second dataflow different from the first dataflow; and
- a second server to automatically perform the second dataflow responsive to the criteria being satisfied.

18. The database system of claim 17, wherein the first server performing the first dataflow is to include applying artificial-intelligence based analytics to the customer data.

19. The database system of claim 17, further comprising:
- the trigger manager to identify a second trigger related to the performing the first or the second dataflow; and
- a third server to instantiate a third dataflow different from the second dataflow associated with the second trigger.

20. The database system of claim 17 wherein the first and second server are the same server.

21. The database system of claim 17, wherein the scheduler performs the determine one or more dataset modified by the dataflow.

22. The database system of claim 17, wherein the trigger requires every dataset associated with the first dataflow to be updated before executing the second dataflow.

23. The database system of claim 22, wherein each dataset associated with the first dataflow corresponds to internal data.

24. The database system of claim 17, wherein the criteria identifies a relationship between one or more dataset modified by the first dataflow, and if the perform the first dataflow satisfies the criteria, then the automatically perform the second dataflow.

25. The database system of claim 17, wherein the relationship provides a Boolean-type statement identifying events associated with the perform the first dataflow that satisfies the condition.

* * * * *